United States Patent
Ray

(10) Patent No.: US 9,215,653 B1
(45) Date of Patent: Dec. 15, 2015

(54) INVOKING NETWORK-BASED TRANSCODING IN RESPONSE TO THRESHOLD LOW BATTERY POWER

(71) Applicant: Sprint Spectrum L.P., Overland Park, KS (US)

(72) Inventor: Amar Nath Ray, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 120 days.

(21) Appl. No.: 14/032,349

(22) Filed: Sep. 20, 2013

(51) Int. Cl.
*H04W 72/00* (2009.01)
*H04W 52/02* (2009.01)

(52) U.S. Cl.
CPC ................ *H04W 52/0206* (2013.01)

(58) Field of Classification Search
CPC .......... H04W 52/367; H04W 72/0406; H04W 52/40; H04W 52/281; H04W 52/346; H04W 52/0206; H04W 52/02; H04W 52/228; H04W 52/365; H04W 72/02; G06F 1/3287; G06F 1/329; G06F 1/3243; G06F 1/3275; G06F 1/3203; G06F 11/1415; G06F 1/32; G06F 1/324; H04L 12/10; H04N 19/00169; H04N 19/00236; H04N 19/00472; H04N 19/00775; H04N 7/26228; H04N 7/26393; H04N 9/3129; G08B 13/19667; G08B 13/19684

USPC ............ 455/456.1, 411, 414.1; 726/4, 14, 17, 726/22; 713/152, 164, 166, 182
See application file for complete search history.

(56) References Cited

U.S. PATENT DOCUMENTS

| | | | |
|---|---|---|---|
| 5,623,533 A * | 4/1997 | Kikuchi et al. | 455/572 |
| 6,072,784 A * | 6/2000 | Agrawal et al. | 370/311 |
| 6,434,139 B1 * | 8/2002 | Liu et al. | 370/352 |
| 2009/0093281 A1 * | 4/2009 | Demirhan et al. | 455/574 |
| 2009/0268755 A1 * | 10/2009 | Inoishi | 370/466 |
| 2010/0159965 A1 * | 6/2010 | Pascal et al. | 455/466 |

* cited by examiner

*Primary Examiner* — Nimesh Patel

(57) ABSTRACT

Methods and systems are provided for conserving battery charge of a wireless communication device (WCD). A radio access network (RAN) and a WCD communicate with data encoded based on one of two codecs. By default, the RAN and the WCD communicate based on a first codec of the two codecs. Communication based on the first codec provides a high-quality audio signal between the RAN and WCD but uses more battery charge. When the battery charge decreases, the WCD can communicate a low-battery indicator to the RAN. Upon receiving the low-battery indicator, the RAN enables a transcoder configured to convert the data encoded based on the first codec into data encoded based on the second codec. After transcoding, RAN and the WCD communicate with based on the second codec. Communication based on the second codec provides a lower-quality audio signal between the RAN and WCD but uses less battery charge.

18 Claims, 5 Drawing Sheets

INVOKING NETWORK-BASED TRANSCODING IN RESPONSE TO THRESHOLD LOW BATTERY POWER

BACKGROUND

To provide cellular wireless communication service, a wireless service provider or "wireless carrier" typically operates a radio access network (RAN) that defines one or more coverage areas in which wireless communication devices (WCDs) can be served by the RAN and can thereby obtain connectivity to broader networks such as the public switched telephone network (PSTN) and the Internet. A typical RAN may include one or more base stations (e.g., base transceiver stations, eNodeBs, access nodes, access points, etc.), each of which may radiate to define a cell and cell sectors in which WCDs can operate. Further, the RAN may include supplementary network infrastructure (e.g., controllers, mobility management entities, etc.), which may be integrated with or otherwise in communication with the various base stations. The supplementary network infrastructure may include, or be in communication with, a switch or gateway that provides connectivity with one or more transport networks. With this or other arrangements, a cell phone, personal digital assistant, wirelessly equipped computer, or any other WCD that is positioned within coverage of the RAN can then communicate with a base station and in turn, via the base station, with other served devices or with other entities on the transport network.

OVERVIEW

During a communication session, a RAN and a WCD form a communication link with a radio signal made up of encoded data. The communication link includes (i) a downlink where the RAN sends data to the WCD and (ii) an uplink where the WCD sends data to the RAN. On the downlink, the RAN encodes data to send to the WCD based on a codec to create an encoded signal. On the uplink, the WCD encodes data to send to the RAN based on a codec to create an encoded signal.

In one embodiment, a RAN and a WCD may selectively form a communication link with a signal encoded based on one of two codecs. When communicating based on a first codec of the two codecs, the RAN and the WCD communicate with a radio signal having data encoded with the first codec and with a first data rate. The first codec enables the RAN and the WCD to communicate with high quality audio signals. When communicating based on a second codec of the two codecs, the RAN and the WCD communicate with a radio signal having data encoded with the second codec and with a second data rate. The second codec enables the RAN and the WCD to communicate with lower quality audio signals, as compared to audio signals based on the first codec. Generally, the first encoding has a higher data rate than the second encoding. The higher data rate, in part, enables the codec to provide a higher quality audio signal.

The RAN may generally operate with a first encoder configured to encode data based on the first codec. However, the RAN may switch to operate with a second encoder configured to encode data based on the second codec in response to receiving a signal from the WCD indicating the remaining battery charge in the battery of the WCD is below a threshold. Thus, the communication link between the RAN and the WCD contains data encoded with the second codec, with the lower data rate, in an attempt to preserve the remaining battery charge of the WCD. When switching to communicate with data encoded based on the second codec, the RAN may enable a transcoder. The transcoder is configured to receive a signal encoded with the first codec and transcode it to based on the second codec. Therefore, the transcoder functions to translated data encoded with one codec into data encoded with a second codec. Alternatively, the RAN my selectively enable either a first encoder or a second encoder based on the current communication mode between the RAN and the WCD. Thus, to communicate with data encoded based on the first codec, the RAN may enable the first encoder and encode data for transmission with the first encoder. To communicate with data encoded based on the second codec, the RAN may enable the second encoder and encode data for transmission with the second encoder.

In some embodiments, the RAN may also include an override indicator. When the RAN detects the override indicator, the RAN operates by encoding data for communication to the WCD with the first codec regardless of the received battery charge signal. Thus, the override indicator may force the RAN to operate by encoding data with the first codec. In one example, a user may indicate a desire to operate the WCD in the first mode (i.e. operate with the higher quality audio signals) through a toggle on the WCD. When the user selects the toggle, the WCD communicates a signal to the RAN creating the override indicator. In another example, the WCD communicates a signal to the RAN creating the override indicator based on an application running on the WCD having an associated quality-of-service (QOS) requirement. If the QOS requirement is greater than a threshold, the WCD both communicates a signal to the RAN creating the override indicator and stays encoding data with the first codec regardless of the battery charge. Various applications, such as games, movies, video conferencing, etc., will have an associated QOS requirement to ensure that audio components of the application are delivered with a desired quality. Thus, the override indicator prevents the RAN from switching to encode the second codec and degrading the performance of the application with the associated QOS requirement.

Additionally, when the RAN switches modes, the RAN may communicate a network indicator to the WCD so that the WCD can adjust its receiver based on the encoding of the communicated signal. To decode the communicated signal, the WCD will have to operate its receiver in a correct codec to decode the encoded signal. If the RAN provides a signal to the WCD having a different encoding than what the receiver of the WCD is configured for, the communication would result in an error. Therefore, by communicating a network indicator to the WCD, the WCD will know the current codec that the RAN will use to transmit communication signals. By knowing the current codec that the RAN will use to transmit communication signals, the WCD may switch its receiver to a mode to properly decode the received signal.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the claims.

BRIEF DESCRIPTION OF THE DRAWINGS

Various embodiments are described herein with reference to the following drawings, wherein like numerals denote like entities.

DETAILED DESCRIPTION

1. Example Communication System Architecture

Figure 1:
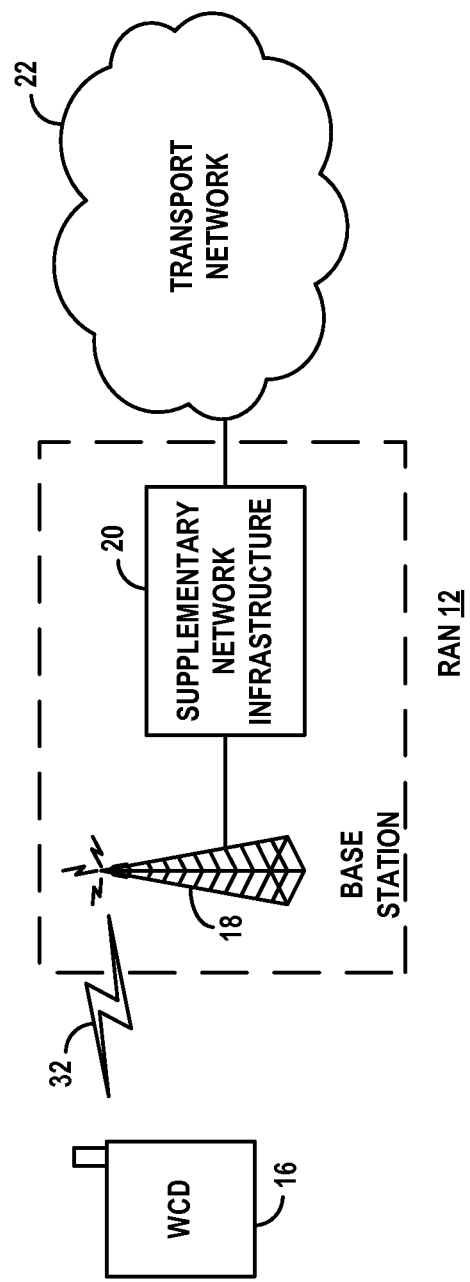
FIG. 1 depicts an example communication system.

Referring to the drawings, FIG. 1 is a simplified block diagram of a network in which at least one embodiment of this disclosure can be implemented. By way of example, the figure depicts a RAN 12 arranged to serve at least one wireless communication device (WCD) such as a representative WCD 16. These representative system arrangements are of course merely examples, and those skilled in the art will understand that numerous variations are possible, ranging from a simple wireless access point router or other such serving device to a far more complex system. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, a processor that executes program instructions stored in memory or another machine-readable medium may carry out various functions.

The RAN 12 is shown including a base station (BS) 18 and supplementary network infrastructure 20 that provides connectivity with a transport network 22 such as the public switched telephone network (PSTN) and/or the Internet. In the disclosed representative system, the BS includes one or more antennas or antenna arrangements that radiate to define one or more air-interface coverage areas, such as cells or cell sectors, in which WCDs can communicate with the BS. FIG. 1 conceptually depicts a representative coverage area 32 provided by RAN 12.

The supplementary network infrastructure may be connected with, and control, one or more BSs and may manage various aspects of air-interface operation, such as handoffs between BSs or the like. Further, in some systems, a radio network controller or other such component provides similar functionality.

The supplementary network infrastructure may include a switch/gateway that may be connected with one or more controller components. The controller components may manage functions such as handoffs between various coverage areas. Further, the switch/gateway may provide connectivity with a transport network. For instance, a switch such as a switching center or gateway may provide connectivity with the PSTN, and a gateway may provide connectivity with a packet-switched network such as the Internet.

Communications in a given coverage area between a representative BS and WCDs such as WCD 16 may define a "forward link" in the direction from the BS to the WCD and a "reverse link" in the direction from the WCD to the BS. The BS and WCD may each be programmed or otherwise equipped to engage in such communications in accordance with an agreed air-interface protocol, examples of which include LTE, CDMA (e.g., 1xRTT or 1xEV-DO), AMPS, AMPA, GPRS, MMDS, UMTS, EDGE, WiMAX (e.g., IEEE 802.16), iDEN, LTE, GSM, TDMA, microwave, satellite, Wi-Fi (e.g., IEEE 802.11), Bluetooth, and others now known or later developed. A given air interface may define a number of discrete communication channels through a time-division multiplexing, code-division multiplexing, frequency-division multiplexing, and/or another mechanism now known or later developed.

On the forward link in each coverage area, a typical air interface protocol may define a pilot signal that WCDs can detect as an indication of the presence of the coverage area and that WCDs can measure as a basis to determine the quality and sufficiency of available coverage. Each pilot signal may include or embody (e.g., be based on) an identifier of the coverage area, so that when a WCD detects the pilot signal, the WCD can associate the pilot signal with a particular coverage area. Further, the forward link may also define other air-interface channels, such as broadcast control channels that provide data defining operational parameters for the coverage area, paging channels through which the BS can direct control messages to particular WCDs, and traffic channels through which the BS can transmit bearer traffic (e.g., voice data, audio data, or other data) to served WCDs.

The reverse link in each coverage area may then likewise define various channels, such as access channels through which WCDs can transmit to the BS access probes that define origination requests, registration requests or the like, and traffic channels through which WCDs can transmit bearer traffic to the BS.

2. Example Network Device

Figure 2:
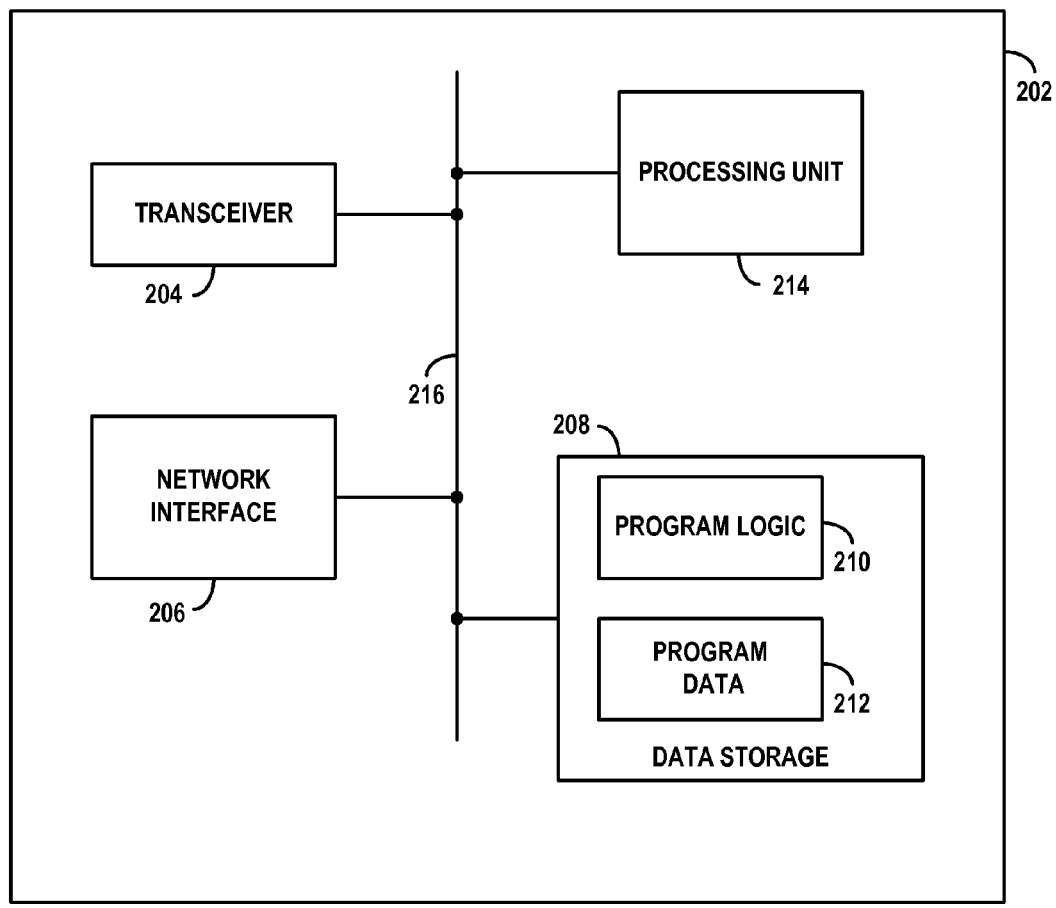
FIG. 2 depicts an example network device.

FIG. 2 is a simplified block diagram depicting functional components of an example network device 202 arranged to carry out some of the functions described herein. The example network device 202 may be representative of BS 18, supplementary network infrastructure 20, supplementary network infrastructure 20 integrated with BS 18, or some other entity associated with transport network 22 in FIG. 1, for instance. As shown in FIG. 2, network device 202 includes a transceiver 204, network interface 206, a processing unit 214, and data storage 208, all of which may be coupled together by a system bus 216 or other mechanism. In addition, the network device may also include external storage, such as magnetic or optical disk storage, although this is not shown in FIG. 2.

These components may be arranged to support conventional operation of BS 18 and supplementary network infrastructure 20 in an LTE-compliant wireless-communication network, such as network 12 illustrated in FIG. 1. The details of such an arrangement and how these components function to provide conventional operation are well-known in the art and are not described further herein. Certain aspects of network device 202 relevant to the functions discussed herein are discussed briefly below.

Network interface 206 in combination with transceiver 204, which may include one or more antennas, enables communication on a network, such RAN 12. Accordingly, network interface 206 may take the form of trunk or optical link that can be coupled with a switch/gateway of supplementary network infrastructure 20, or any Ethernet network interface card or other physical connection that can be coupled with any other entity on the RAN 12 or transport network 22, for instance. Further, network interface 206 in combination with transceiver 204 enables air-interface communication with one or more WCDs, supporting forward-link transmissions of protocol version messages, among other message and commands, and supporting reception reverse-link traffic on reverse links. The interface 206 may also include a module, such as a chipset that may support wireless packet-data communications according to an LTE family of protocols.

Processing unit 214 comprises one or more general-purpose processors (e.g., INTEL microprocessors) and/or one or more special-purpose processors (e.g., dedicated digital signal processor, application-specific integrated circuit, etc.). In turn, the data storage 208 comprises one or more volatile and/or non-volatile storage components, such as magnetic or optical memory or disk storage. Data storage 208 can be integrated in whole or in part with processing unit 214, as cache memory or registers for instance. As further shown, data storage 208 is equipped to hold program logic 210 and program data 212. Program logic 210 may comprise machine-language instructions that define routines executable by processing unit 214 to carry out various functions described herein.

Those skilled in the art will appreciate that there can be numerous specific implementations of a network device (e.g., a BS, MSC, eNodeB, other switch or gateway, or other entity associated with a transport network) that could be used in connection with at least one embodiment.

3. Example WCD

Figure 3:
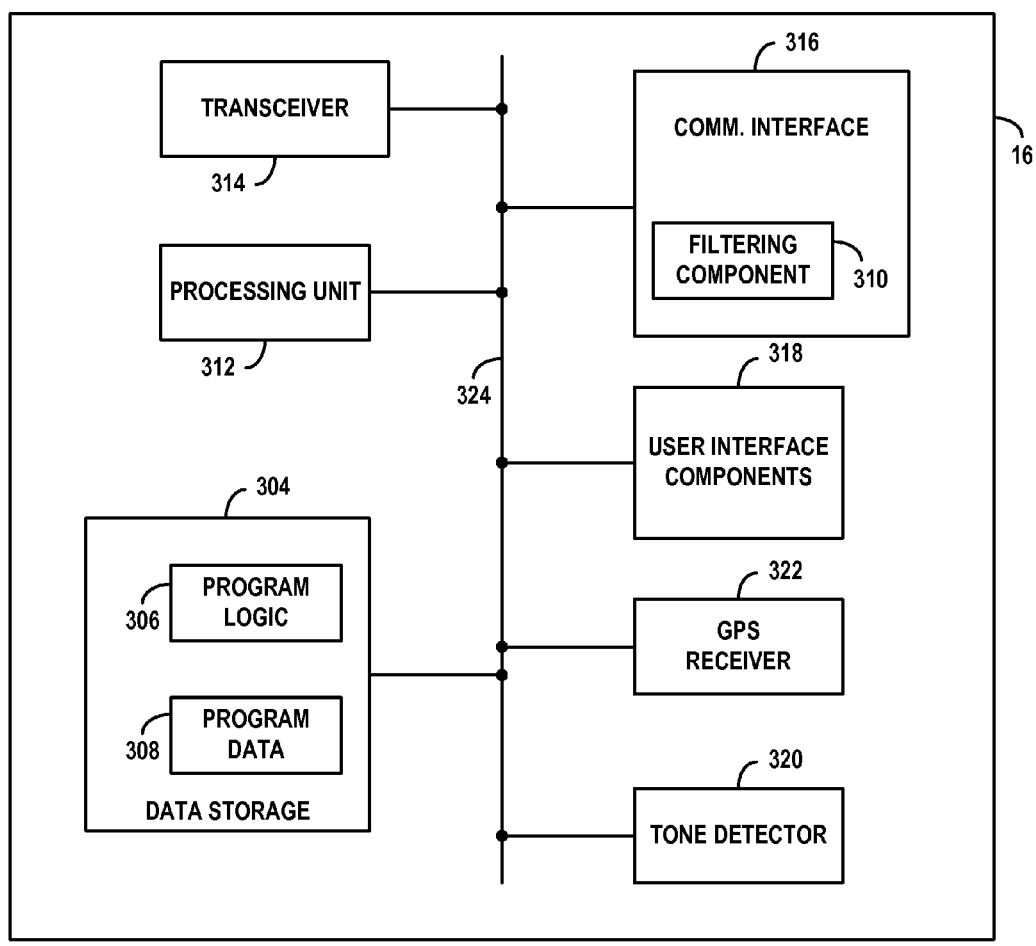
FIG. 3 depicts an example wireless communication device (WCD)

FIG. 3 is a simplified block diagram depicting functional components of an example WCD 16 that may be arranged to carry out at least one embodiment. The example WCD 16 could be or include a cell phone, a personal digital assistant (PDA), a pager, a wired or wirelessly-equipped notebook computer, and/or any other sort of device. As shown in FIG. 3, the example WCD 16 includes data storage 304, processing unit 312, transceiver 314, communication interface 316, user-interface components 318, tone detector 320, and GPS receiver 322, all of which may be coupled together by a system bus 324 or other mechanism.

These components may be arranged to support operation of the WCD 16 in an LTE-compliant wireless-communication network, such as RAN 12 illustrated in FIG. 1. The details of such an arrangement are well known in the art and are not described further herein. Certain aspects of WCD 16 may be relevant to at least one embodiment as described herein and are discussed briefly below.

Although FIG. 3 portrays communication interface 316 and transceiver 314 as separate components, in some embodiments a single chipset may integrate both communication interface 316 and transceiver 314. Communication interface 316 in combination with transceiver 314, which may include one or more antennas, may enable communication with a network. Such communication may include the reception of data or voice communication from the serving base station and transmission of data or voice to the serving base station. The communication interface may include a module that supports wireless packet-data communications according to an LTE family of protocols, among many options. The transceiver 314 includes both a transmitter and a receiver for the WCD 16. Additionally, the transceiver 314 may include an antenna configured to send signals created by the transmitter and receive signals from a BS of a RAN. The communication interface 316 may include a baseband processor configured to control the transceiver 314. The baseband processor may function to encode and decode the communication signals that are sent and received. The baseband processor may perform the encoding and decoding based on one or more codecs. The communication interface 316 may also include a filtering component 310.

The filtering component 310 is configured to filter received RF signals based on the RF bandwidth of signals received by the WCD 16. In some embodiments, the filtering component 310 may be an integrated circuit configured to filter signals that are transmitted and/or received by the WCD 16. The filtering component 310 may have the ability to adjust the bandwidth over which frequencies are filtered. In order to adjust the bandwidth over which frequencies are filtered, the filtering component 310 may include one or more individual filters. Each individual filter may have an associated filtering bandwidth and may be individually enabled or disabled. To create a desired filtering bandwidth, a plurality of filters in the filtering component may be enabled. The filtering bandwidth is approximately equivalent to the total bandwidth of the enabled individual filters.

To adjust a filtering bandwidth of the filtering component 310, the baseband processor of the communication interface 316 may selectively turn enable or disable at least one of multiple filters contained within the filtering component 310. When the filtering bandwidth is narrowed, the communication interface 316 may responsively disable a subset of the filters contained within the filtering component. Because each enabled filter consumes battery power, disabling a subset of the filters helps to conserve WCD battery life.

Processing unit 312 comprises one or more general-purpose processors (e.g., INTEL microprocessors) and/or one or more special-purpose processors (e.g., dedicated digital signal processor, application specific integrated circuit, etc.). In turn, the data storage 304 comprises one or more volatile and/or non-volatile storage components, such as magnetic or optical memory or disk storage. Data storage 304 can be integrated in whole or in part with processing unit 312, as cache memory or registers for instance. In example WCD 16, as shown, data storage 304 is configured to hold both program logic 306 and program data 308. Program logic 306 and/or program data 308 may comprise machine-language instructions that define routines executable by processing unit 312 to carry out at least one embodiment as described herein.

In at least one embodiment, processing unit 312 is embedded with a wireless chipset, and thus may be part of communication interface 316.

GPS receiver 322 may be any known or hereafter-developed GPS receiver, suitable for receiving and decoding GPS signals for location and timing purposes, perhaps among other purposes; in some embodiments, WCD 16 does not have a location module such as GPS receiver 322, or has location-determination technology that takes another form.

It will be appreciated that there can be numerous specific implementations of a WCD, such as WCD 16, that may be arranged to carry out at least one embodiment as described herein. Further, given this disclosure, one of skill in the art would understand how to devise and build such an implementation.

4. Example RAN Transcoder

Figure 4:
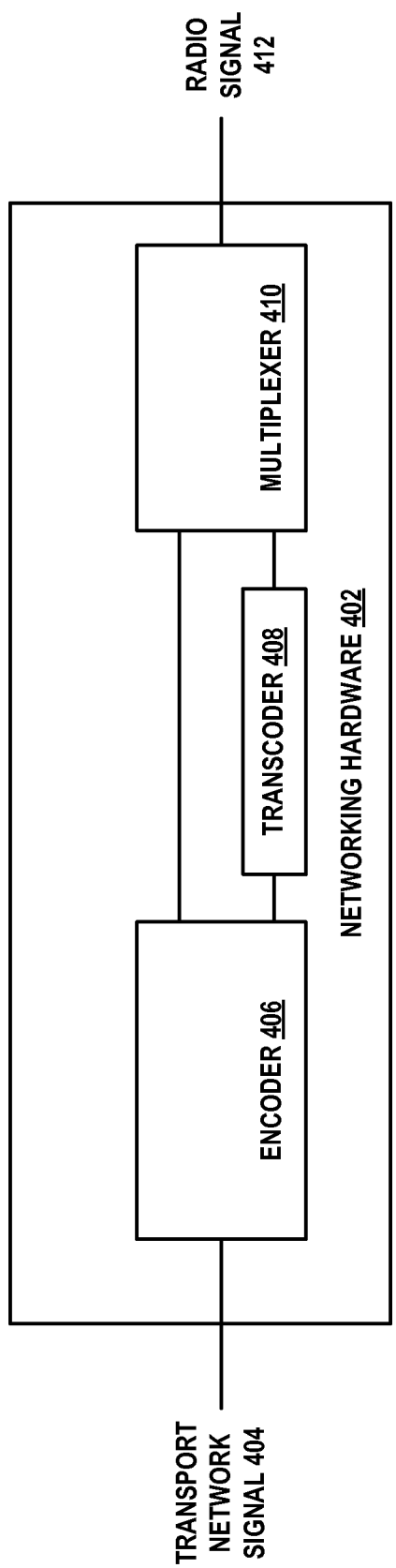
FIG. 4 is a conceptual illustration of a RAN with a transcoder.

FIG. 4 is a conceptual illustration of networking hardware 402 of a RAN. The networking hardware 402 may form a portion of the network interface 206 of FIG. 2. Generally, the networking hardware 402 is configured to translate a transport network signal 404 to a radio signal 412 as well as to translate a radio signal 412 to a transport network signal 404. Because signals communicated by the transport network (22 of FIG. 1) are generally encoded differently than those signals communicated to or from a WCD over a radio link, signals may need a conversion to a different encoding. Additionally, the networking hardware 402 includes a transcoder 408 configured to transcode a first signal into a second signal based on receiving a low battery indication from a WCD.

In practice, on the downlink side, the networking hardware 402 is configured to receive a signal, such as transport network signal 404, and to output an encoded signal, such as radio signal 412. In some embodiments, the transport network signal 404 is an audio signal and the radio signal 412 takes the form of an encoded audio signal for radio transmission to a WCD. Conversely, on the uplink side, the networking hardware 402 is configured to receive an encoded signal from a WCD, such as such as radio signal 412, and to output a signal to the transport network, such as transport network signal 404.

More specifically, for the downlink, the networking hardware 402 receives the transport network signal 404 and feeds it to an encoder 406. The encoder 406 encodes the transport network signal 404 based on a codec of the encoder 406. The codec of the encoder 406 will encode the transport network signal 404 with a specific set of parameters. For example, a codec may specify a data rate and a bandwidth for the encoded signal. Thus, when encoded, the resulting data will have a data rate and a bandwidth based on the given codec of the encoder 406. The bandwidth and data rate of a codec may influence the quality of the audio signal provided to the WCD. A wider bandwidth and/or a higher data rate may enable a higher quality communication.

In one specific example, the encoder 406 may encode the transport network signal 404 based on the Enhanced Variable Rate Codec (EVRC). EVRC may have a bandwidth of 8000 Hertz (Hz) and a data rate of approximately 8.55 kilobits a second. EVRC is one possible codec for use in the present system and other codecs may be used as well.

The output of the encoder may be provided to a transcoder 408 and to multiplexer 410. The transcoder 408 transcodes (e.g., re-encodes) the signal output from the encoder 406. The transcoder 408 will transcode the signal based on a second codec, where the second codec is different from the first codec. The second codec may have either a bandwidth and/or a data rate that is different than the first codec. In one example, the transcoder may covert an EVRC encoded signal into a G.722 codec encoded signal. The G.722 codec encoded signal may have a bandwidth of 7000 Hz and a data rate of approximately 64 kilobits a second. Further, in some embodiments, the network hardware 402 only enables the transcoder 408 after receiving the low battery indicator from the WCD. Thus, the transcoder 408 may not be powered until it is needed. However, in other embodiments, the transcoder 408 may be powered and operation when the network hardware 402 is in a communication session.

Communicating data with the second codec may also allow the WCD to operate in a mode that reduces the WCD's power usage, as compared to when the WCD and the RAN communicate data based on the first codec. The WCD's power usage may be decreased based on either reducing an RF bandwidth of the received signal, using a less computationally intensive codec, or some combination thereof. When the RF bandwidth of the transmitted signal is reduced, a filtering component in the WCD may disable a subset of filters. When filters are disabled, the power usage of the WCD may be reduced. Additionally, using a less computationally intensive codec may reduce the power usage of the WCD. More complexly encoded data may require more processing power from the WCD to decode. Conversely, less complexly encoded data may require less processing power from the WCD to decode. Therefore, if data encoded based on the second codec requires less computation from the WCD than data encoded with the first codec, the WCD may save power when the RAN transmits a signal to the WCD with the second codec.

Additionally, each codec may have an associated encoding time. In some embodiments, the first codec and the second codec may each have different encoding times. For example, the first codec may encode data more quickly than the second codec. Thus, the first codec may have a shorter encoding time than the second encoder. When data is transmitted to the WCD from the RAN, the data will have a transmission delay at least as long as the encoding time for the codec(s) used for encoding the data. When data is transmitted based on the first codec, the delay time will be at least as long as the encoding time of the first codec. In some embodiments, when data is transmitted based on the second codec, the delay time will be at least as long as the encoding time of the first codec and the second codec combined. Because data encoded based on the second codec was originally encoded with the first codec, the delay of both codecs will be aggregated to create the total encoding time. Because the encoding time of the second codec will always be longer than the encoding time of the first codec (when the data is transcoded), the data with second codec will always be transmitted with a longer delay time.

In some embodiments, the networking hardware may also include a multiplexer 410. For downlink communications, the multiplexer 410 selects which of the two signals, either the signal output by the encoder 406 or the signal output by the transcoder 408, the antenna of the RAN will transmit to the WCD as a radio signal. The multiplexer 410 may default to outputting the signal from the encoder 406. When the RAN receives a low battery indicator from the WCD, the multiplexer 410 may switch to outputting the signal from the transcoder 408. The multiplexer 410 may revert to outputting the signal from the encoder 406 based on a variety of criteria. First, the multiplexer 410 may revert based on receiving a secondary indicator from the WCD indicating an override of the low battery indicator. Second, the multiplexer 410 may revert based on the communication between the RAN and the WCD having a QOS requirement. Third, the multiplexer 410 may revert based on a period of time having elapsed after switching. Other methods to revert are possible as well.

More specifically for the uplink, the networking hardware 402 receives the radio signal 412 and converts it to a signal for communication to transport network via transport network signal 404. In practice, for the uplink, network hardware 402 may function in the reverse of how the network hardware 402 functions for the downlink. In one embodiment, the network hardware 402 feeds the received signal to a multiplexer 410. Based on the codec associated with the received radio signal 412, the multiplexer 410 may route the radio signal 412 to either the transcoder 408 or the encoder 406. If the radio signal 412 is encoded based on the first codec, it may be routed to the encoder 406. However, if the radio signal 412 is encoded based on the second codec, it may be routed to the transcoder 408. In other embodiments, the network hardware 402 may feed the received radio signal 412 to both the transcoder 408 and the encoder 406.

When used with the uplink, the encoder 406 decodes the radio signal 412 based on a codec of the encoder 406. The codec of the encoder 406 will decode the radio signal 412 in order to communicate it to the transport network via transport network signal 404. The decoding may be performed with a specific set of parameters (such as those discussed above with respect to encoding). When the output of the multiplexer 410 is provided to the transcoder 408, the transcoder converts the output of the multiplexer 410 into a signal that is encoded based on the first codec. The transcoder 408 transcodes (e.g., re-encodes) the signal output from the multiplexer 410. The signal output by the transcoder 408 may be encoded based on the first encoding. Therefore, the signal output by the transcoder 408 may then be decoded by the codec of the encoder 406. The output of encoder 406 may be communicated to the transport network via transport network signal 404

Thus, when the WCD and the RAN are communicating with data encoded based on the first codec, the encoder 406: (i) encodes data received from the transport network for communication to the WCD and (ii) decodes data from the WCD for communication via the transport network. And when the WCD and the RAN are communicating with data encoded based on the second codec, the transcoder 408: (i) encodes data received from the transport network that has been encoded with encoder 406 for communication to the WCD and (ii) decodes data from the WCD for further decoding by the encoder 406 for ultimate communication via the transport network.

5. Example Operation

Figure 5:
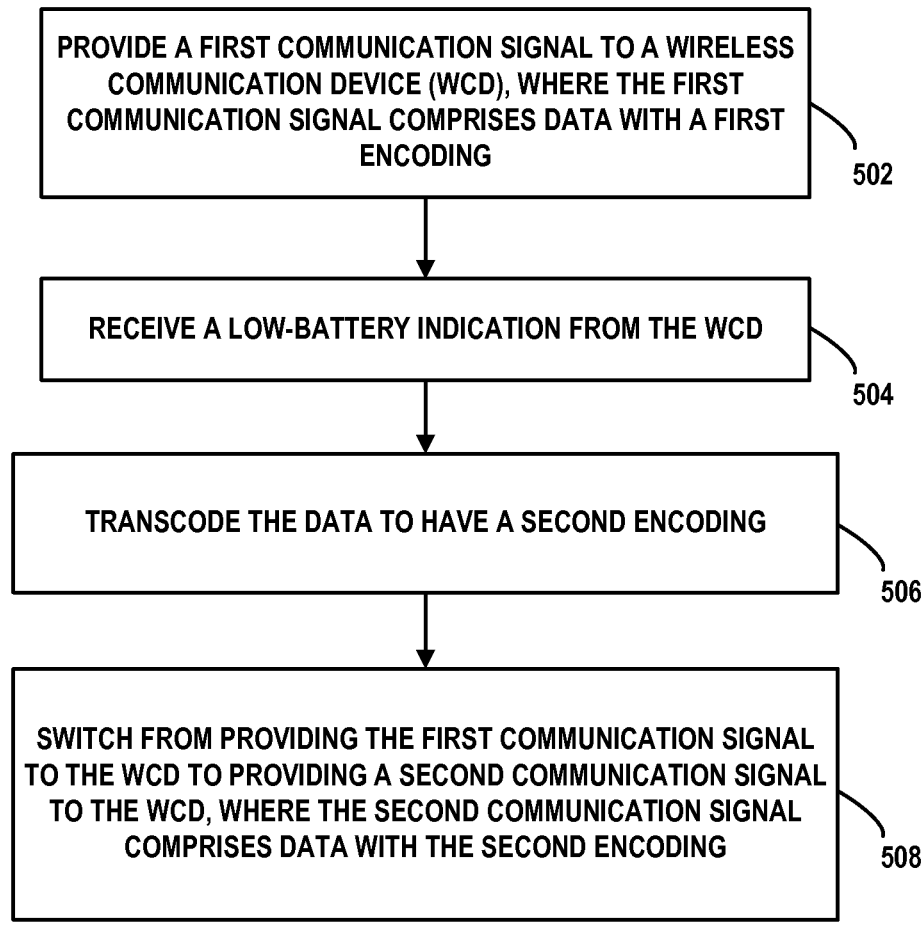
FIG. 5 is a flowchart of a method for changing the operating mode of a RAN.

FIG. 5 is a flow chart depicting functions that can be carried out by a RAN in accordance with at least one embodiment. The method of FIG. 5 may be performed while the WCD transmits and receives information during an ongoing communication session. Alternatively, the method of FIG. 5 may be performed while the WCD operates in an idle mode and it not currently transmitting or receiving data.

As shown in FIG. 5, the flowchart begins at block 502, where the RAN and the WCD communicate with a first communication signal. The first communication signal has data that is encoded based on a first encoding. As previously discussed, the first communication signal may be encoded based on a first codec. The first communication may be configured to provide a high quality audio signal between the RAN and the WCD with the data encoded in the communication signal. Further, the first communication may include both an uplink and downlink communication between the RAN and the WCD.

At step 504, the RAN receives an indicator of a remaining battery charge of a battery in the WCD being below a threshold. Because when the WCD communicates with the RAN using communication signal having data encoded with the first codec provides a high quality audio signal, it also may use more battery life of the WCD. Thus, it may be desirable for the WCD to communicate a low battery indicator to the RAN in order to indicate for the RAN to switch codecs for communication. By communicating with the RAN using data encoded based on the second codec the WCD may be able to conserve its remaining battery power.

For example, in some embodiments, the WCD may determine the remaining battery charge at a given point in time by determining the percentage of the charge that remains or that has been used, the total amount of charge that remains or that has been used, or the expected remaining battery life (e.g., time until the battery is fully drained). In additional embodiments, the WCD may determine the remaining battery charge based on a voltage of the battery. As a battery charge decreases, the battery voltage may decrease at the same time. Other examples are also possible.

As previously discussed, in one embodiment, the RAN may switch communication codecs based on receiving an indication of a remaining battery charge in the battery of the WCD. Thus, the RAN will switch to communicating with the WCD with a signal encoded with the second codec in an attempt to preserve the remaining battery charge. In another embodiment, the WCD may receive an instruction to switch to the second codec. In this embodiment, receiving the instruction to switch to the second codec causes the RAN to switch the codec used for encoding data. For example, the WCD may have a user-controlled toggle configured to allow a user of the WCD to instruct the WCD to switch between the first codec and the second codec. The WCD may present the toggle to a user of the WCD through a display of the WCD. The toggle may indicate that it functions to switch the WCD from high-power mode to low-power mode (or from high-quality audio to low-quality audio). Thus, when the user selects to switch modes, the WCD may communicate the low battery indicator to the RAN and the RAN may responsively switch to communicating with the second codec.

In some embodiments, the RAN also includes an override indicator that effectively prevents the RAN from switching to communicating with data encoded based on the second codec. When the RAN has the override indicator present, the RAN communicates with the WCD with data encoded with the first codec regardless of receiving a low battery indicator from the WCD. Thus, the override indicator may force the RAN to communicate with the WCD using data encoded based on the first codec. In one example, a user may indicate a desire to operate the WCD in the high-power mode through a toggle on the WCD, similar to the previously discussed toggle. When the user selects the high-power mode via the toggle, the WCD communicates a signal to the RAN creating the override indicator.

In another example, the override indicator indicates an application running on the WCD has an associated QOS requirement greater than a threshold. If the QOS requirement is less than the threshold, the override indicator is not created. Various applications that the WCD may execute, such as games, movies, video conferencing, etc., have an associated QOS requirement to ensure that audio components of the application are delivered with a desired quality. The QOS requirement ensures the RAN delivers audio to the WCD encoded with a codec having high audio quality. The override indicator prevents the RAN from switching to a low-audio-quality codec and degrading the audio performance of the application with the QOS requirement. The QOS requirement may be either (i) determined by the WCD and communicated to the RAN or (ii) determined by the RAN.

In practice, at block 506, in response to receiving the low charge indication from the WCD, the RAN transcodes the data encoded with the first codec based on the second codec. As previously discussed, the RAN, via a transcoder, transcodes the data based on a second codec, creating a second communication signal having a second encoding. The second codec is different than the first codec, having either a bandwidth and/or a data rate that is different than the first codec. The second audio codec provides a lower quality audio signal than the first audio codec, based on the second audio codec generally having either a narrower audio bandwidth and/or lower data rate than the first audio codec.

At block 508, the RAN switches from providing the first communication signal to the WCD to providing the second communication signal, with the second encoding, to the WCD. When the RAN provides the second communication signal with the second encoding to the WCD, the WCD may operate in a mode that saves battery power. The second communication signal may reduce the WCDs power usage compared to communicating with the first signal based on either having a reduced an RF bandwidth, using a less computationally intensive codec, or some combination thereof. As previously discussed, when the RF bandwidth of the transmitted signal is reduced, a filtering component in the WCD may disable a subset of filters. When filters are disabled, the power usage of the WCD may be reduced.

Additionally, by using a less computationally intensive codec for the second communication, the power usage of the WCD may be decreased, as compared to the first communication. More complexly encoded data may require more processing power from the WCD to decode, therefore using more battery energy. Conversely, battery energy may be saved based on communicating with less complex encoded data that may require less processing power from the WCD to decode. Therefore, if the second codec requires less computation from the WCD than the first codec, the WCD may save power when the RAN transmits a signal to the WCD with the second codec.

6. Conclusion

Various exemplary embodiments have been described above. Those skilled in the art will understand, however, that changes and modifications may be made to these embodiments without departing from the scope of the claims.

I claim:

1. A method carried out by a wireless base station (BS) during an ongoing communication session, comprising:
   receiving into the BS a transport network signal from a transport network;
   encoding by the BS the transport network signal using a first codec to produce audio data encoded with the first codec, wherein encoding the transport network signal to produce audio data encoded with the first codec has an associated first delay time;
   transmitting from the BS over an air interface to a wireless communication device (WCD) a communication signal comprising audio data encoded with the first codec, wherein the communication signal has a first radio frequency (RF) bandwidth and a first transmission delay at least as long as the first delay time;
   receiving a low-charge indication from the WCD; and
   in response to receiving the low-charge indication from the WCD, (i) transcoding by the BS audio data encoded with the first codec to produce audio data encoded with a second codec instead of the first codec, wherein transcoding data encoded with the first codec to have a second encoding has an associated second delay time, and (ii) switching by the BS from transmitting to the WCD audio data encoded with the first codec to transmitting to the WCD audio data encoded with the second codec, wherein the communication signal transmitting audio data encoded with the second codec has a second RF bandwidth that is less than the first RF bandwidth, and wherein the communication signal transmitting audio data encoded with the second codec has a second transmission delay at least as long as a total of the first delay time and the second time.

2. The method of claim 1, wherein a first data rate of the communication signal comprising audio data encoded with the first codec is greater than a second data rate of the communication signal comprising audio data encoded with the second codec.

3. The method of claim 1, wherein the first codec is an Enhanced Variable Rate Codec and the second codec is a G.722 codec.

4. The method of claim 1, wherein transmitting to the WCD the audio data encoded with a first codec is in response to a Quality of Service (QOS) requirement for an application executed by the WCD exceeding a QOS threshold.

5. The method of claim 4, wherein the BS determines the QOS requirement.

6. The method of claim 4, wherein the BS receives an indication of the QOS requirement from the WCD.

7. A method carried out by a wireless base station (BS) during an ongoing communication session, comprising:
   receiving a transport network signal from a transport network;
   encoding the transport network signal based on a first codec, wherein encoding the transport network signal based on the first codec has an associated first delay time;
   the BS transmitting over an air interface to a wireless communication device (WCD) a communication signal comprising audio data encoded with the first codec, wherein the communication signal has a first radio frequency (RF) bandwidth and a first transmission delay at least as long as the first delay time;
   receiving a low-charge indication from the WCD; and
   in response to receiving the low-charge indication from the WCD,
   (i) transcoding by the BS audio data encoded with the first codec to produce audio data encoded with a second codec instead of the first codec, wherein transcoding data encoded with the first codec to have a second encoding has an associated second delay time, and
   (ii) switching by the BS from transmitting to the WCD audio data encoded with the first codec to transmitting to the WCD audio data encoded with the second codec, wherein the communication signal transmitting audio data encoded with the second codec has a second RF bandwidth that is less than the first RF bandwidth, and wherein the communication signal transmitting audio data encoded with the second codec has a second transmission delay at least as long as a total of the first delay time and the second time.

8. The method of claim 7, wherein a first data rate of the communication signal comprising data encoded with the first codec is greater than a second data rate of the communication signal comprising data encoded with the second codec.

9. The method of claim 7, wherein transmitting to the WCD data encoded with a first codec is in response to a Quality of Service (QOS) requirement for an application executed by the WCD exceeding a QOS threshold, the BS providing the first communication signal to the WCD.

10. The method of claim 9, wherein the BS provides the communication signal comprising data encoded with the first codec to the WCD regardless of the receiving the low-charge indication from the WCD.

11. The method of claim 9, wherein the BS receives an indication of the QOS requirement from the WCD.

12. The method of claim 9, wherein the BS calculates the QOS requirement.

13. A wireless base station (BS), comprising:
   a wireless-communication interface configured to communicate with WCD;
   a processor; and
   data storage containing instructions executable by the processor for carrying out functions during an ongoing communication session, the functions including:
   a) receiving into the BS a transport network signal from a transport network;
   b) encoding by the BS the transport network signal using a first codec to produce audio data encoded with the first codec, wherein encoding the transport network signal to produce audio data encoded with the first codec has an associated first delay time;
   c) transmitting to the WCD with the wireless-communication interface a communication signal comprising audio data encoded with the first codec, wherein the communication signal has a first radio frequency (RF) bandwidth and a first transmission delay at least as long as the first delay time;
d) in response to the wireless-communication interface receiving a low-charge indication from the WCD,
(i) transcoding audio data encoded with the first codec to produce audio data encoded with a second codec instead of the first codec, wherein transcoding data encoded with the first codec to have a second encoding has an associated second delay time, and
(ii) switching the wireless-communication interface from transmitting to the WCD audio data encoded with a first codec to transmitting to the WCD audio data encoded with the second codec, wherein the communication signal transmitting audio data encoded with the second codec has a second RF bandwidth that is less than the first RF bandwidth, and wherein the communication signal transmitting audio data encoded with the second codec has a second transmission delay at least as long as a total of the first delay time and the second time.

14. The wireless base station of claim 13, wherein a first data rate of the communication signal comprising audio data encoded with the first codec is greater than a second data rate of the communication signal comprising audio data encoded with the second codec.

15. The wireless base station of claim 13, wherein the first codec is an Enhanced Variable Rate Codec and the second codec is a G.722 codec.

16. The wireless base station of claim 13, wherein transmitting to the WCD audio data encoded with a first codec is in response to a Quality of Service (QOS) requirement for an application executed by the WCD exceeding a QOS threshold.

17. The wireless base station of claim 16, wherein the BS determines the QOS requirement.

18. The wireless base station of claim 16, wherein the BS receives an indication of the QOS requirement from the WCD.

* * * * *